US012423468B2

(12) United States Patent
Karpovsky et al.

(10) Patent No.: US 12,423,468 B2
(45) Date of Patent: Sep. 23, 2025

(54) SMART SAMPLING FOR SENSITIVE DATA DETECTION

(71) Applicant: Microsoft Technology Licensing, LLC, Redmond, WA (US)

(72) Inventors: Andrey Karpovsky, Kiryat Motzkin (IL); Moshe Israel, Ramat-Gan (IL); Shimon Ezra, Petach Tikva (IL); Ron Matchoro, Hogla (IL); Asaf Nakash, Yavne (IL); Moran Polack, Caesarea (IL); Anastasia Kovalkov, Harish (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 18/118,009

(22) Filed: Mar. 6, 2023

(65) Prior Publication Data

US 2024/0303368 A1 Sep. 12, 2024

(51) Int. Cl.
G06F 21/62 (2013.01)

(52) U.S. Cl.
CPC ...... G06F 21/6245 (2013.01); G06F 21/6209 (2013.01)

(58) Field of Classification Search
CPC .. G06F 21/56; G06F 21/6245; G06F 21/6209; G06F 21/577
See application file for complete search history.

(56) References Cited

U.S. PATENT DOCUMENTS

| | | | | |
|---|---|---|---|---|
| 7,752,669 | B2 * | 7/2010 | Palliyil | H04L 63/1491 713/188 |
| 7,904,420 | B2 * | 3/2011 | Ianni | G06F 16/16 707/620 |
| 8,139,588 | B2 * | 3/2012 | Hardjono | H04L 63/0876 370/400 |
| 10,275,396 | B1 * | 4/2019 | Hart | G06F 16/353 |
| 10,452,273 | B2 * | 10/2019 | Carpenter | G06F 3/061 |
| 2011/0015967 | A1 * | 1/2011 | Bhattacharya | G06Q 10/04 705/302 |
| 2012/0131012 | A1 * | 5/2012 | Taylor | G06Q 10/00 707/752 |
| 2013/0290208 | A1 * | 10/2013 | Bonmassar | G06Q 10/1053 705/321 |
| 2016/0012235 | A1 | 1/2016 | Lee et al. | |
| 2016/0134696 | A1 * | 5/2016 | Datuashvili | G06F 16/24556 707/626 |
| 2016/0357739 | A1 * | 12/2016 | Rathinagiri | G06F 16/1827 |
| 2019/0286827 | A1 * | 9/2019 | Chang | G06F 16/176 |
| 2020/0314386 | A1 * | 10/2020 | McClellan | H04N 7/181 |
| 2020/0380160 | A1 * | 12/2020 | Kraus | G06F 21/577 |

OTHER PUBLICATIONS

International Search Report and Written Opinion received for PCT Application No. PCT/US2024/017192, Jul. 9, 2024, 14 pages.

* cited by examiner

*Primary Examiner* — Etienne P Leroux
(74) *Attorney, Agent, or Firm* — Schwegman Lundberg & Woessner, P.A.

(57) ABSTRACT

A computer implemented method includes obtaining a list of information storage resources that contain electronic files and forming multiple clusters of the information storage resources from the list of information storage resources. A subset of the information storage resources is selected from the clusters. Each subset the information storage resources is scanned for a selected type of content. The selected information storage resources are flagged as containing the selected type of content as a function of the scanning finding the selected type of content.

18 Claims, 3 Drawing Sheets

SMART SAMPLING FOR SENSITIVE DATA DETECTION

BACKGROUND

Sensitive data stored in cloud data storage resources may be compromised by unintentional exposure to others or by active malicious activity. The compromise of such sensitive data can have significant detrimental effect both on resource providers and data owners. Flagging and managing data stored in the cloud is referred to as DSPM (Data Security Posture Management). Some form of data management may also be required by regulations.

The presence of sensitive data in cloud resources may be unknown due to large amounts of cloud data traffic, a multitude of contributors, and a complexity of data flows. In such cases, cloud resources may be scanned to active detect sensitive data.

A full scan of the cloud resources provides accurate results but can be extremely costly in terms of time (up to several days) and computing resources. In some cases, a customer may decline to use the full scan due to the computing resource consumption and commensurate cost, as well as the invasiveness of the scanning process. Despite potentially high accuracy, overall security suffers due to choices made to not perform scans.

Automated processes running on machines can generate millions of transactions per minute resulting in even more data being stored in cloud resources. Machine-generated data may result in even larger amounts of data being stored in cloud resources, greatly increasing the risk of sensitive data being stored on cloud resources and making it even more costly to scan cloud resources for sensitive data.

SUMMARY

A computer implemented method includes obtaining a list of information storage resources that contain electronic files and forming multiple clusters of the information storage resources from the list of information storage resources. A subset of the information storage resources is selected from the clusters. Each subset the information storage resources is scanned for a selected type of content. The selected information storage resources are flagged as containing the selected type of content as a function of the scanning finding the selected type of content.

DETAILED DESCRIPTION

Figure 1:
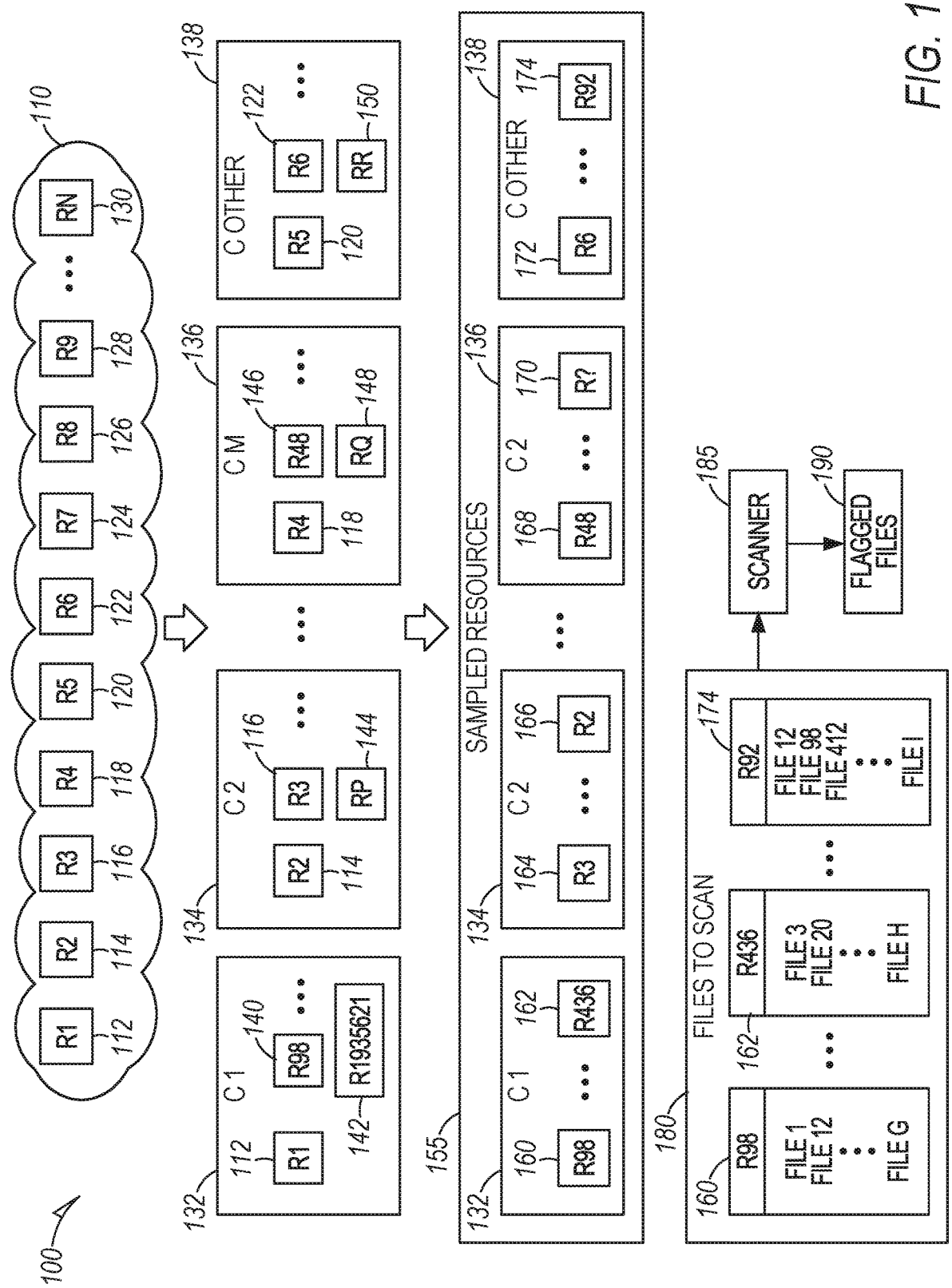
FIG. 1 is a block diagram representation of resources that are sampled in an improved smart sampling method for sensitive information according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Sensitive data is routinely stored in cloud-based storage. Such sensitive data can include many different types of data, such as personal data of employees, customers, or others. Phone numbers, addresses, passwords, usernames, social security numbers, and credit card and bank account information may be deemed sensitive data that should be tracked to understand where such sensitive data is stored and to ensure that appropriate security measures are taken for cloud resources storing sensitive data. Security measures may include different levels of encryption and access controls to appropriately control access and prevent unauthorized access. Such security measures may cost more to implement for sensitive data than for non-sensitive data. As such, it is important to clearly understand where the sensitive data is stored and apply commensurate access controls.

Cloud resources may be scanned to look for detectible features of sensitive data. Such features may include naming conventions and characteristics of sensitive data. For example, a social security number may have a field name of SSN, Social Security Number. or other name used by an owner of the data. The data itself may have a particular format, like "nnn-nn-nnnn" of "nnnnnnnnnn" for social security numbers. Code names for projects may also be used as a feature to search for resources containing information related to confidential information related to a project. Each such characteristic for different types of sensitive data may be generated and used to search for similar information in a full scan of all the cloud resources used by a particular owner. While fully scanning cloud resources to determine whether or not sensitive data is present in a particular resource, such full scans take significant amounts of time and computing resources to perform.

An improved scanning method utilizes a smart sampling approach to detect sensitive data in cloud-based information storage resources, such as storage devices, directories, containers, and other physical and logical structures for storing data in the cloud. Information storage resources may contain electronic files or blobs that may include structured data or unstructured data. Smart sampling involves the selection of a subset of elements from the population to estimate characteristics of the whole population of electronic files. While survey (using the whole population) is ideal in terms of accuracy and representation, the cost of acquiring and analyzing the data is often too high.

Smart sampling clusters resources based on available information regarding the resources, such as naming conventions, access patterns, and tags. Similar resources are grouped together to form clusters. Following clustering, a number of resources within the clusters are selected for full scanning. To ensure a full scan, resources within each cluster may be selected. The number of resources selected from a cluster may be based on the probability of finding sensitive items within the cluster. This method of smart sampling ensures that scanning resources with different sizes will result in similar probabilities of finding sensitive data, ensuring an efficient and accurate scan.

Smart sampling finds the correct balance between the accuracy of the results and the cost of the scanning where the distribution of sensitive data is not uniform across all resources, but rather changes between different clusters of resources. Smart sampling is most accurate when the information inside each cluster is similar.

Grouping the resources together is referred to as stratified sampling. In stratified sampling, the resources divided into different strata based on predefined known features. It is assumed that while the whole population is heterogeneous in estimated quality, it is significantly more homogeneous within each stratum.

FIG. 1 is a block diagram representation 100 of resources that are sampled in an improved smart sampling method for sensitive information. The storage resources may be cloud based storage resources as indicated at 110. In one example, thousands to millions of storage resources are indicated as R1-RN at 112, 114, 116, 118, 120, 122, 124, 126, 128, and 130. The storage resources may be first listed to ensure all storage resources are considered. The resources may be containers or directories, or even storage devices that contain multiple files storing content, such as alphanumeric data, images, or other type of content. The containers or directories may be logically organized in multiple levels, such as directories and sub-directories in various examples, each having different names and other attributes that may be referred to as metadata. Generating the list of resources may include traversing all the directories to obtain an accurate list.

The metadata is used in one example to identify multiple clusters indicated at C1 132, C2, 134, . . . . CM 136, and C Other 138. Clustering may be based on the metadata such as naming conventions, access patterns, and tags. Similar resources are grouped together to form each cluster. Common recurring tokens, mask GUIDs and iterative numbers, etc., may be clustered. Containers not belonging to clusters are grouped together as 'others'.

In various examples, a machine running an application may generate resources having similar names. The resources with similar names may be grouped in a first cluster. The application may generate resources having the same name with a numeric value that increments with each new resource being generated. The metadata may include information regarding access patterns, either by time or accessing IP address. Those resources having similarities, such as similar access patterns may also be grouped into clusters. Any clustering algorithm may be used to group resources, such as K-means clustering or other algorithms capable of computing a distance between features and corresponding groupings into clusters may also be used that are likely to group similar resources, that are likely to contain similar data, together.

Distribution of sensitive labels inside the same cluster is assumed to be uniform. The probability of finding k sensitive items when s sensitive items exist and d items are actually scanned may be calculated as $P(k|\{s,d\})$.

The proportion of sensitive items may be estimated based on previous full scans as (~0.001 of all items). The probability that a sufficient number of sensitive items will be found to correctly flag the resource as sensitive can be calculated given some budget of scans. The budget may be a parameter selected by a user. For example, in a case of a resource containing 100,000 items, given a budget of scanning 200 items results in the chance to find at least 10 of an existing 100 sensitive items being above 0.8. The actual usage of smart scanning protocol ensures that this probability under a provided budget is optimal.

A number of resources per cluster may be selected as indicated at sampled resources 155. As shown at sampled resources 155, a subset of resources from a cluster, less than the full set of resources in the cluster are selected. In one example, the same number of resources per cluster are selected, such as X resources per cluster, based on predefined formula. A function which is monotonically increasing, but with slowing down rate controlled by parameters may be used. Such a function capping of the number of resources chosen for sampling at a desired level. In one example, a logarithmic transformation is used to calculate the number of resources to sample:

$$X = \min\left(n,\, n^{1-0.01 \cdot \log_b n}\right)$$

The transformation includes parameters X, n, and b, where X is the number of resources per cluster to be randomly chosen, n is the number of existing resources per cluster, and b, base=2 when the cluster is other or none, and base=2.4 otherwise.

Sample results for the logarithmic transformation include:

| n | f(n, base = 2.4) | f(n, base = 2.9) |
|---|---|---|
| 100 | 78 | 82 |
| 1,000 | 580 | 639 |
| 100,000 | 22,002 | 28,797 |
| 1,000,000 | 113,021 | 166,514 |
| 100,000,000 | 2,073,601 | 4,129,628 |

The value of X is increasing together with n, but the rate slows down in a way controlled by the parameters. This allows us to effectively cap the result at some desired level. A table including more values that the above table may be used to determine the number of samples using the above algorithm or another algorithm that provides similar characteristics.

Sampled resources 155 illustrates clusters 132, 134, 136, and 138, each with an example subset of resources indicated at 160, 162, 164, 166, 168, 170, 172, and 174. Any function that generates substantially random numbers may be used to select the resources for each subset in the clusters.

A next step in smart sampling includes selecting files from the sampled resources as shown at files to scan 180. In one example, files per resource are randomly enumerated based on an existing budget. The easiest way is to divide the budget by number of chosen resources in sampled resources 155. Resource 160, R98 shows that files 1, 12, . . . . G were enumerated or selected. Resource 162, R436 shows files 3, 20 . . . . H were selected. The number of files selected is less than the total number of files per resource unless the resource contains very few files, which is unlikely in most situations. In an alternative example, the number of files selected may vary based on a risk of exposure of a given resource. More protected files may have fewer files chosen for scanning as the risk is low that such files and the data in the files may be exposed in an unauthorized manner. Varying the number of files selected enables less protected resources to be scanned more thoroughly with any given scanning budget.

Selected files are sent to a content scanner 185, that scans file content and flags them in a flagged files list 190 as either sensitive or not. This scanner has additional heuristic improvements, such as limiting number of actual scans of files of the same filetype within the same location. Optionally, the scanner 185 can employ adaptive logic, where scan and sampling results dynamically affect one another. Also, the scanner 185 can work in a dynamic way, exiting immediately with a verdict when a desired sensitivity probability of files containing sensitive data is reached.

The flagged files list 190 contains a list of files that contain sensitive information. A file may be flagged as containing sensitive information in response to the file containing one or more instances of data that matches entries in a list of sensitive data features. Each such match is assigned a probability of match, and may also contain an indication of the level of sensitivity of the data corresponding to the feature.

A single match in a file with a high probability, such as 99% match, may trigger the file being flagged. A probability threshold may be implemented as a user settable parameter. Example probability thresholds include but are not limited to 99%, 95%. 90% or values therebetween, higher, or lower. In further examples, perhaps three or four matches are found with lower probabilities of 80%. Since several potential matches at lower probability were found, the combined probability that the file contains sensitive data may be high enough to flag the file, with the combined probability exceeding or meeting a selected probability threshold.

Adding a weighting factor for the level of sensitivity of the data corresponding to the features may result in higher or lower probabilities being generated. An example of a type of sensitive data with a higher sensitivity may be a social security number. The probability may be increased for data found matching the structure of a social security number, making it more likely that a resource will be flagged if it is found to contain such data. Further examples may include credit card numbers or passwords and user ids. Data that may be less sensitive, such as an address of a user, may be given a lower weight. The sensitivities and probability threshold may be user settable parameters.

Figure 2:
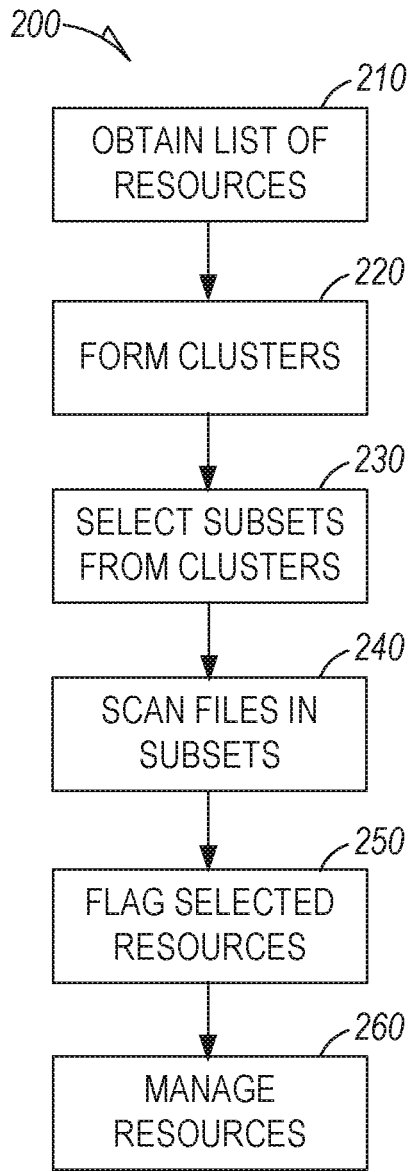
FIG. 2 is a flowchart illustrating a method of sampling resources for scanning for one or more selected types of content according to an example embodiment.

FIG. 2 is a flowchart illustrating a method 200 of sampling resources for scanning for one or more selected types of content, such as sensitive data. Method 200 begins at operation 210 by obtaining a list of information storage resources that contain electronic files. The storage resources may be first listed to ensure all storage resources are considered. The resources may be containers or directories, or even storage devices that contain multiple files storing content, such as alphanumeric data, images, or other type of content. The containers or directories may be logically organized in multiple levels, such as directories and subdirectories in various examples, each having different names and other attributes that may be referred to as metadata. Generating the list of resources may include traversing all the directories to obtain an accurate list.

Multiple clusters of the information storage resources are formed from the list of information storage resources at operation 220. Clustering may be based on the metadata such as naming conventions, access patterns, and tags. Similar resources are grouped together to form the clusters. Common recurring tokens, mask GUIDs and iterative numbers, etc., may be clustered. Containers not belonging to clusters are grouped together as 'others'.

In various examples, a machine running an application may generate resources having similar names. The resources with similar names may be grouped in a first cluster. The application may generate resources having the same name with a numeric value that increments with each new resource being generated. The metadata may include information regarding access patterns, either by time or accessing IP address. Those resources having similarities, such as similar access patterns may also be grouped into clusters. Any clustering algorithm may be used to group resources, such as K-means clustering or other algorithms capable of computing a distance between features and corresponding groupings into clusters may also be used that are likely to group similar resources, that are likely to contain similar data, together.

Operation 230 selects a subset of the information storage resources from each cluster. Information storage resources for inclusion in a subset may be selected randomly with the number of information storage selected being based on a monotonically increasing function to cap the number of information storage resources selected from each cluster. In one example, a logarithmic transformation is used to calculate the number of resources to sample:

$$X = \min\left(n,\ n^{1-0.01 \cdot \log_b n}\right)$$

The transformation includes parameters X, n, and b, where X is the number of resources per cluster to be randomly chosen, n is the number of existing resources per cluster, and b, base=2 when the cluster is other or none, and base=2.4 otherwise.

The subset of the information storage resources from each of the clusters is scanned at operation 240 for a selected type of content. The selected type of content may be data identified as sensitive by a user. The number of resources to scan is an adjustable parameters to control the amount of resources consumed by scanning. This allows a user a degree of freedom to perform scanning in a manner that balances resource utilization for scanning against performance of other operations or transactions.

Scanning the subset of the information storage resources from the clusters for a selected type of content comprises comparing information in each file of the subset of a cluster for a list of sensitive data features. In one example, fewer than all files in a resource may be scanned by selecting a subset of the files. The file in the subset may be selected randomly or otherwise.

At operation 250, selected information storage resources are flagged as containing the selected type of content as a function of the scanning finding the selected type of content. In one example, scanning the subset of the information storage resources from the clusters for a selected type of content includes generating a probability of sensitive data being present as a function of data in a file matches a sensitive data feature. The probability may be based on a weighted sensitivity of the sensitive data feature. An information storage resources may be flagged at operation 250 or otherwise indicated as containing the selected type of content based on comparing the probability of one or more matches to a probability threshold.

In one example, the flags identify resources or even groups of resources associated with user accounts as either containing sensitive data or not. Based on the flagged files, DSPM (Data Security Posture Management) actions may be taken at operation 260, such as providing enhanced security for flagged information storage resources or modifying processes to ensure sensitive data is routed to other more secure storage resources.

Figure 3:
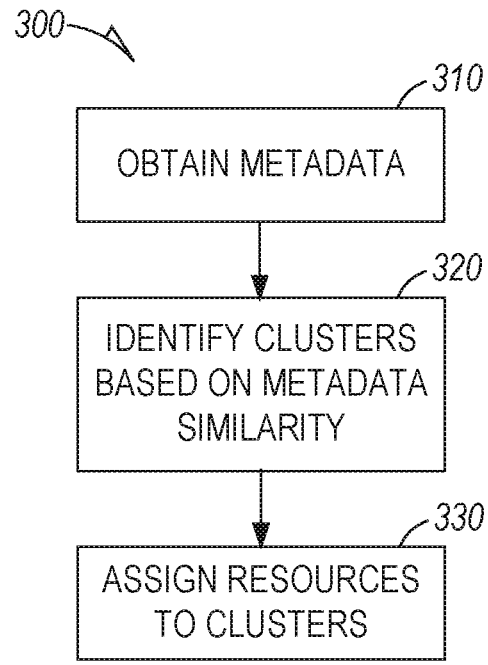
FIG. 3 is a flowchart illustrating a method for forming multiple clusters of information storage resources according to an example embodiment.

FIG. 3 is a flowchart illustrating a method 300 for forming multiple clusters of information storage resources. Method 300 begins at operation 310 by obtaining metadata descriptive of the information storage resources. The metadata may include information regarding access patterns, either by time or accessing IP address.

Clusters are identified at operation 320 based on similarities of the metadata. Clustering may be based on the metadata such as naming conventions, access patterns, and tags. Similar resources are grouped together to form each cluster. Common recurring tokens, mask GUIDs and iterative numbers, etc., may be clustered. Containers not belonging to clusters are grouped together as 'others'.

At operation 330, each information storage resource is assigned to an identified cluster as a function of distance between the similarities for each electronic file. The similarities may include similar file names, which may be grouped in a first cluster. Resources having the same name with a numeric value that increments with each new resource being generated may be included in a cluster. Those resources having similarities, such as similar access patterns may also be grouped into clusters. Any clustering algorithm may be used to group resources, such as K-means clustering or other algorithms capable of computing a distance between features and corresponding groupings into clusters may also be used that are likely to group similar resources, that are likely to contain similar data, together.

Figure 4:
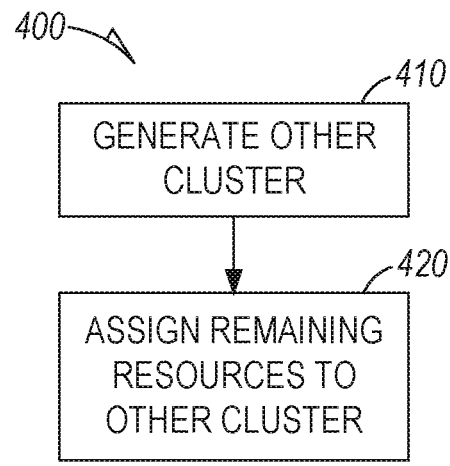
FIG. 4 is a flowchart illustrating a method of creating a further or "other" cluster for information storage resources that do not fit within an identified cluster according to an example embodiment.

FIG. 4 is a flowchart illustrating a method 400 of creating a further or "other" cluster for information storage resources that do not fit within an identified cluster. The other cluster may include information storage resources that do not share significant similarities. The other cluster is generated beginning at operation 410 by identifying the other cluster for information storage resources not assigned to an identified cluster. Operation 420 assigns information storage resources not assigned to identified clusters to the other cluster. The logarithmic transformation uses a higher base for the other cluster such that more information storage resources are selected for the other cluster than for an identified cluster having a similar number of electronic files. Using a higher base, or using some other function that provides a higher sampling rate for unrelated information storage resources ensures that sufficient information storage resources are selected for scanning to increase the probability that sensitive data will be found if present.

Smart scanning may be repeated as needed over time or as new content is added. The accuracy vs cost balance may be controlled at desired level. This level can be customized via parameters to be more accurate yet costly results for different application, such as financial applications. The ability to control the amount of budget for scanning results in better utilization of scanning for sensitive data by more users, thus improving security postures.

In parallel with smart scanning, a small percentage of electronic files may be scanned at random, to provide data for testing assumptions, validating results and further exploration. The process can be validated in different ways.

During a research phase, smart scanning may be performed alongside full scanning to allow testing of whether clustering was done correctly to group together homogenous items. In normal use by users, a small percentage of items may be scanned at random, thus providing a constant stream of data for testing assumptions and further exploration.

Figure 5:
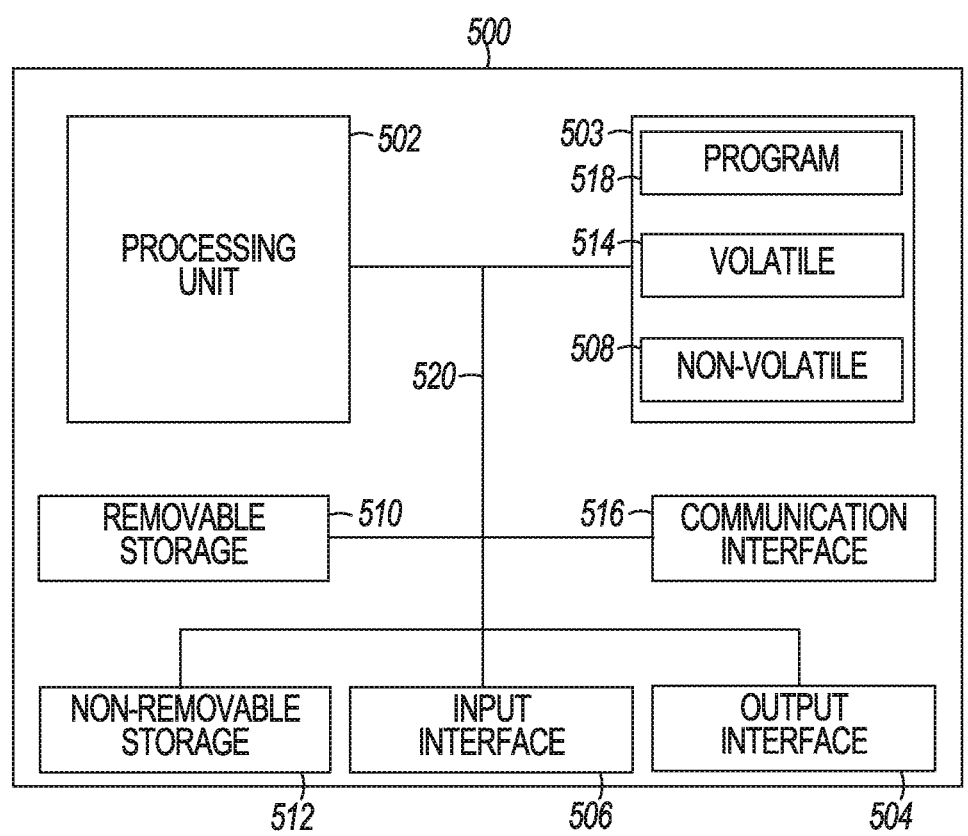
FIG. 5 is a block schematic diagram of a computer system to implement one or more example embodiments.

FIG. 5 is a block schematic diagram of a computer system 500 to perform smart sampling, implementing cloud-based information storage resources, and for performing methods and algorithms according to example embodiments. All components need not be used in various embodiments.

One example computing device in the form of a computer system 500 may include a processing unit 502, memory 503, removable storage 510, and non-removable storage 512. Although the example computing device is illustrated and described as computer system 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer system 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer system 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer system 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer system 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer system 500 are connected with a system bus 520.

Computer-readable instructions stored on a computer-readable medium are executable by the processing unit 502 of the computer system 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes obtaining a list of information storage resources that contain electronic files and forming multiple clusters of the information storage resources from the list of information storage resources. A subset of the information storage resources is selected from the clusters. Each subset the information storage resources is scanned for a selected type of content. The selected information storage resources are flagged as containing the selected type of content as a function of the scanning finding the selected type of content.

2. The method of example 1 wherein the selected type of content is data identified as sensitive by a user.

3. The method of any of examples 1-2 wherein the information storage resources include a container, folder, directory, or storage device.

4. The method of any of examples 1-3 wherein forming multiple clusters includes obtaining metadata descriptive of the information storage resources, identifying clusters based on identified similarities of the metadata, and assigning each information storage resource to an identified cluster as a function of distance between the similarities for each electronic file.

5. The method of any of examples 1-4 wherein selecting a subset of the information storage resources from a cluster is random with the number of information storage resources selected being based on a monotonically increasing function to cap the number of information storage resources selected from a cluster.

6. The method of example 5 wherein the monotonically increasing function includes a logarithmic transformation.

7. The method of example 6 wherein identifying clusters includes identifying an other cluster for information storage resources not assigned to an identified cluster, assigning such information storage resources to the other cluster, and wherein the logarithmic transformation uses a higher base for the other cluster such that more information storage resources are selected for the other cluster than for an identified cluster having a similar number of electronic files.

8. The method of example 7 wherein a number of resources to scan is adjustable to control an amount of resources consumed by scanning.

9 The method of any of examples 1-8 wherein scanning the portion of the information storage resources from the clusters for a selected type of content includes comparing information in the files of the subset of the clusters for a list of sensitive data features.

10. The method of any of examples 1-9 wherein scanning the portion of the information storage resources from the clusters for a selected type of content includes comparing information in randomly selected files of the subset of the clusters for a list of sensitive data features.

11. The method of example 10 wherein scanning the subset of the information storage resources from the clusters for a selected type of content includes generating a probability of sensitive data being present as a function of data in a file matches a sensitive data feature.

12. The method of example 11 wherein generating a probability is based on a weighted sensitivity of the sensitive data feature.

13. The method of any of examples 11-12 wherein flagging selected information storage resources as containing the selected type of content is performed by comparing the probability of one or more matches to a probability threshold.

14. A machine-readable storage device having instructions for execution by a processor of a machine to cause the processor to perform operations to perform any of the methods of examples 1-13.

15. A device includes a processor and a memory device coupled to the processor and having a program stored thereon for execution by the processor to perform to perform any of the methods of examples 1-13.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor. ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term. "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from the described systems. Other embodiments may be within the scope of the following claims.

The invention claimed is:

1. A computer implemented method comprising:
    obtaining a list of information storage resources that contain electronic files;
    forming multiple clusters of the information storage resources containing the electronic files from the list of information storage resources based on similarities of metadata in the electronic files descriptive of the information storage resources, wherein forming multiple clusters comprises:
        obtaining metadata descriptive of the information storage resources;
        identifying clusters based on identified similarities of the metadata; and
        assigning information storage resources to identified clusters as a function of distance between the similarities of the electronic files;
    selecting a subset of the information storage resources from the clusters;
    scanning the subset of the information storage resources from the clusters for a selected type of sensitive content; and
    flagging selected information storage resources as containing the selected type of sensitive content as a function of the scanning finding the selected type of content.

2. The method of claim 1 wherein the selected type of sensitive content is data identified as sensitive by a user.

3. The method of claim 1 wherein the information storage resources comprise a container, folder, directory, or storage device.

4. The method of claim 1 wherein selecting a subset of the information storage resources from a cluster is random with the number of information storage resources selected being based on a monotonically increasing function to cap the number of information storage resources selected from a cluster.

5. The method of claim 4 wherein the monotonically increasing function comprises a logarithmic transformation.

6. The method of claim 5 wherein identifying clusters includes:
    identifying an other cluster for information storage resources not assigned to an identified cluster;
    assigning such information storage resources to the other cluster; and
    wherein the logarithmic transformation uses a higher base for the other cluster such that more information storage resources are selected for the other cluster than for an identified cluster having a similar number of electronic files.

7. The method of claim 6 wherein a number of resources to scan is adjustable to control an amount of resources consumed by scanning.

8. The method of claim 1 wherein scanning the portion of the information storage resources from the clusters for a selected type of content comprises comparing information in the files of the subset of the clusters for a list of sensitive data features.

9. The method of claim 1 wherein scanning the portion of the information storage resources from the clusters for a selected type of content comprises comparing information in randomly selected files of the subset of the clusters for a list of sensitive data features.

10. The method of claim 9 wherein scanning the subset of the information storage resources from the clusters for a selected type of content comprises generating a probability of sensitive data being present as a function of data in a file matches a sensitive data feature.

11. The method of claim 10 wherein generating a probability is based on a weighted sensitivity of the sensitive data feature.

12. The method of claim 10 wherein flagging selected information storage resources as containing the selected type of content is performed by comparing the probability of one or more matches to a probability threshold.

13. A machine-readable storage device having instructions for execution by a processor of a machine to cause the processor to perform operations to perform a method, the operations comprising:
    obtaining a list of information storage resources that contain electronic files;
    forming multiple clusters of the information storage resources containing the electronic files from the list of information storage resources based on similarities of metadata in the electronic files descriptive of the information storage resources, wherein forming multiple clusters comprises:
        obtaining metadata descriptive of the information storage resources;
        identifying clusters based on identified similarities of the metadata; and
        assigning each information storage resource to identified clusters as a function of distance between the similarities of the electronic files;
    selecting a subset of the information storage resources from the clusters;
    scanning the subset of the information storage resources from the clusters for a selected type of sensitive content; and
    flagging selected information storage resources as containing the selected type of sensitive content as a function of the scanning finding the selected type of content.

14. The device of claim 13 wherein the selected type of sensitive content is data identified as sensitive by a user and wherein the information storage resources comprise a container, folder, directory, or storage device.

15. The device of claim 13 wherein selecting a subset of the information storage resources from the clusters is random with the number of information storage resources selected being based on a monotonically increasing logarithmic transformation.

16. The device of claim 15 wherein identifying clusters includes:
    identifying an other cluster for information storage resources not assigned to an identified cluster;
    assigning such information storage resources to the other cluster; and
    wherein the logarithmic transformation uses a higher base for the other cluster such that more information storage resources are selected for the other cluster than for an identified cluster having a similar number of electronic files.

17. A device comprising:
a processor; and
a memory device coupled to the processor and having a program stored thereon for execution by the processor to perform operations comprising:
  obtaining a list of information storage resources that contain electronic files;
  forming multiple clusters of the information storage resources containing the electronic files from the list of information storage resources based on similarities of metadata in the electronic files descriptive of the information storage resources, wherein forming multiple clusters comprises:
    obtaining metadata descriptive of the information storage resources;
    identifying clusters based on identified similarities of the metadata; and
    assigning information storage resources to identified clusters as a function of distance between the similarities of the electronic files;
  selecting a subset of the information storage resources from the clusters;
  scanning the subset of the information storage resources from the clusters for a selected type of sensitive content; and
  flagging selected information storage resources as containing the selected type of sensitive content as a function of the scanning finding the selected type of content.

18. The device of claim 17 wherein forming multiple clusters includes:
  identifying an other cluster for information storage resources not assigned to an identified cluster;
  assigning such information storage resources to the other cluster;
  wherein selecting a subset of the information storage resources from the clusters is random with the number of information storage resources selected being based on a monotonically increasing logarithmic transformation; and
  wherein the logarithmic transformation uses a higher base for the other cluster such that more information storage resources are selected for the other cluster than for an identified cluster having a similar number of electronic files.

* * * * *